United States Patent

Low et al.

[15] 3,663,828

[45] May 16, 1972

[54] FAILSAFE MULTIPLE TRANSFORMER CIRCUIT CONFIGURATION

[72] Inventors: George M. Low, Deputy Administrator of the National Aeronautics and Space Administration, with respect to an invention of; Horacio Eduardo Gavira, 11350 E. Walcroft St., Lakewood, Calif. 90715

[22] Filed: Oct. 20, 1970

[21] Appl. No.: 82,280

[52] U.S. Cl. ...................... 307/83, 307/103, 323/48, 323/82
[51] Int. Cl. ........................................... G05f 1/48
[58] Field of Search ............... 307/83, 103; 323/48, 49, 82

[56] References Cited

UNITED STATES PATENTS

| | | | |
|---|---|---|---|
| 1,073,598 | 9/1913 | Fortescue | 307/83 X |
| 2,173,559 | 9/1939 | Mitchell | 307/83 X |
| 3,358,247 | 12/1967 | Klockow | 307/83 X |

*Primary Examiner*—Robert K. Schaefer
*Assistant Examiner*—William J. Smith
*Attorney*—John R. Manning, Monte F. Mott and Paul F. McCaul

[57] ABSTRACT

A failsafe multiple transformer circuit configuration, useful in providing power to electrical loads is disclosed. A circuit configuration for applying power to direct current loads includes a plurality of transformer circuits connected in parallel. Each transformer circuit includes a diode bridge rectifier circuit having the input terminals thereof connected across a secondary coil and the output terminals thereof mutually coupled in parallel with the output terminals of all other transformer circuits. Equalizing reactors are connected in series with the secondary coils to compensate for voltage imbalances that may be developed in the respective transformer circuits. A direct current load may be connected across the mutually coupled output terminals of the respective transformer circuits.

Alternating current loads are accommodated by a plurality of parallel coupled transformer circuits each including a transformer having a pair of secondary coils. The respective secondary coils are parallel connected in two sets, one set for each half cycle. A diode rectifier is connected in series with each secondary coil and a silicon-controlled rectifier (SCR), associated with each set of secondary coils, is serially connected with an alternating current load. Equalizing reactors are employed in both sets of secondary coil circuits in the same manner as they were employed in the direct current configuration.

11 Claims, 3 Drawing Figures

Patented May 16, 1972

INVENTOR.
HORACIO EDUARDO GAVIRA

ATTORNEY

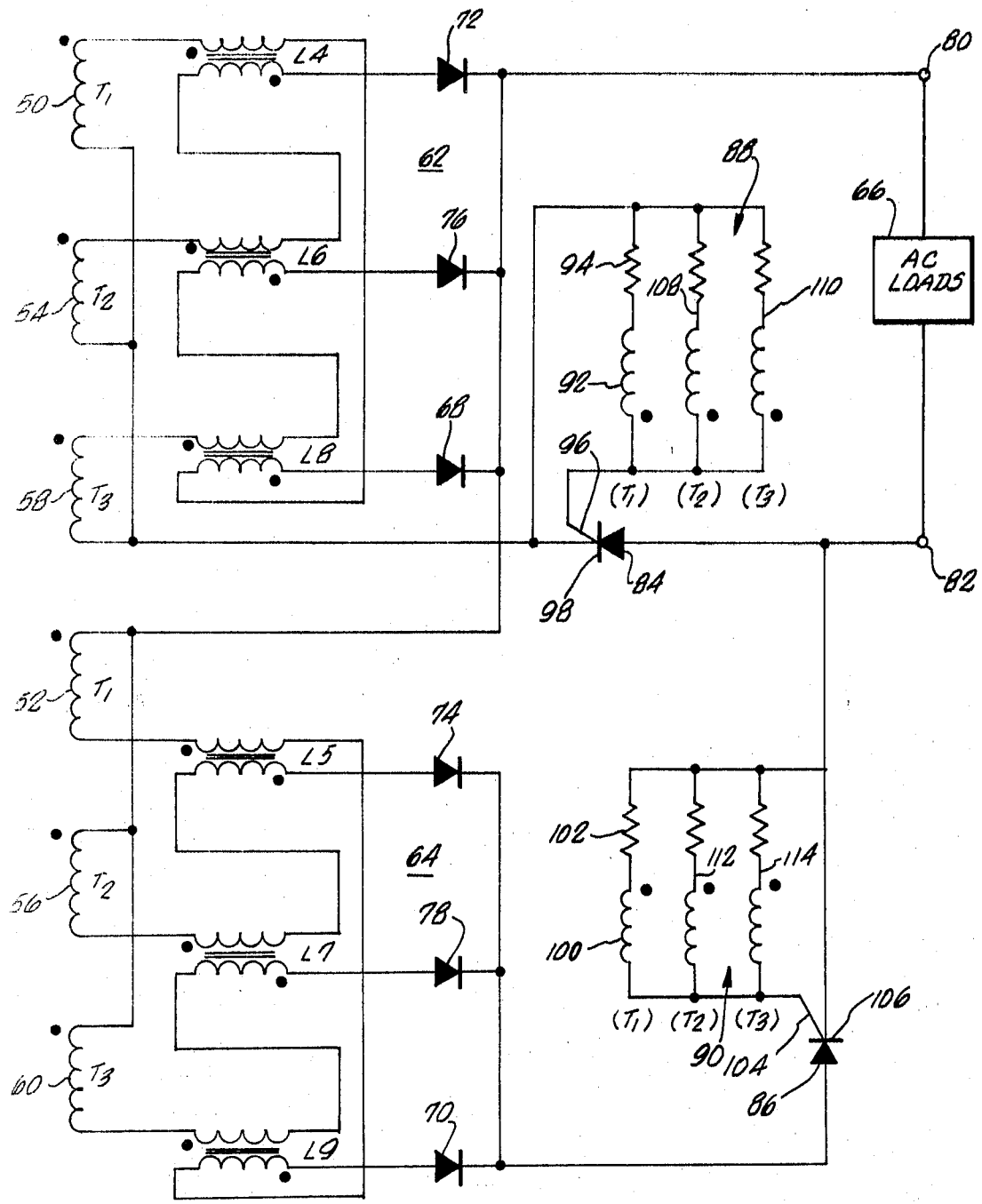
FIG_2

FAILSAFE MULTIPLE TRANSFORMER CIRCUIT CONFIGURATION

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

This invention generally relates to transformer circuits for providing a high degree of reliability. More specifically, the present invention concerns multiple transformer circuit configurations for enabling failsafe operation in the application of power to electrical loads.

2. Description of the Prior Art

There are a great number of present day applications for transformers. In many of these applications, such as in electrical circuits employed aboard satellites, it is necessary to reasonably insure continued operation.

The customary manner of insuring continued operation is to employ redundant standby or backup components which are activated upon the failure of the primary circuit or component. These standby circuits or components are ordinarily intended to remain idle until failure of the primary component occurs.

In order that the backup or standby component be timely activated, provisions for detecting the failure of the primary circuit must be employed. Failure detection circuits employed for this purpose are ordinarily complex and generally involve a sizable number of elements or components. Additionally, these failure detection circuits are customarily submitted to extensive testing to assure a high degree of accuracy and reliability. In some instances, even backup or standby failure detectors may be employed to provide the desired degree of reliability.

It is readily recognizable that in many of the applications requiring extra high degrees of reliability, limited space and weight allowances are available. Such applications may be again exemplified by electrical systems employed aboard a satellite. The prior art techniques of providing reliability can thus be clearly seen to have the disadvantage of requiring the use of complex and therefore costly units which contribute "dead" weight to a payload.

Further disadvantages are particularly associated with the prior art techniques of insuring continued transformer operation. For example, an interruption of power is usually experienced during the finite time interval required to detect a failure, disconnect the damaged or inoperative transformer, and switch to the idle standby or backup component. Such an interruption of power may produce additional malfunctions in associated circuits thereby effectively producing a cascade of failures.

OBJECTS AND SUMMARY OF THE INVENTION

It is therefore an object of the present invention to provide a multiple transformer circuit configuration that will assure a high degree of reliability.

It is another object of the present invention to provide a multiple transformer circuit configuration that does not incorporate idle standby or backup components.

It is another object of the present invention to provide a failsafe transformer configuration that does not require the use of complex fault or malfunction detection circuits.

It is a further object of the present invention to provide a multiple transformer circuit that may be employed to provide continuous power to a load despite any malfunction of a transformer.

It is a yet further object of the present invention to provide transformer circuits that may be employed to supply power to either alternating current or direct current loads.

It is a still further object of the present invention to provide a transformer circuit that is simpler, less costly and lighter in weight than prior art transformer configurations.

Briefly described, the present invention involves a failsafe transformer configuration comprising a plurality of parallel coupled transformer circuits including an associated number of reactors for compensating and correcting for voltage imbalances in the respective transformer circuits.

More particularly, direct current loads are accommodated by each of the transformer circuits including a full wave rectifier diode bridge which is connected across the secondary coil of a transformer. Equalizing reactors are serially connected in pairs with the secondary coils such that the voltage drop produced across the reactors is effectively cancelled by the voltages produced across the reactors of the other transformer circuits when such transformer circuits are functioning properly. Compensating voltages are produced across the reactors whenever an abnormal amount of current is flowing through any of the secondary coils.

Alternating current loads are accommodated by a plurality of parallel coupled transformer circuits each including a transformer having a pair of secondary coils. The secondary coils are connected to form two sets, one for each alternating current half cycle. A diode rectifier is serially coupled with each secondary coil and a silicon-controlled rectifier, associated with each of the two sets of secondary coils, is serially connected with the load. Voltage imbalances are again compensated for by serially connecting equalizing reactors with the secondary coils.

BRIEF DESCRIPTION OF THE DRAWINGS

FIG. 3 is a graphic diagram illustrating exemplary waveforms of voltages that may appear at the secondary coils, which waveforms are useful in describing the operation of the equalizing reactors.

DESCRIPTION OF THE PREFERRED EMBODIMENT

Figure 1:
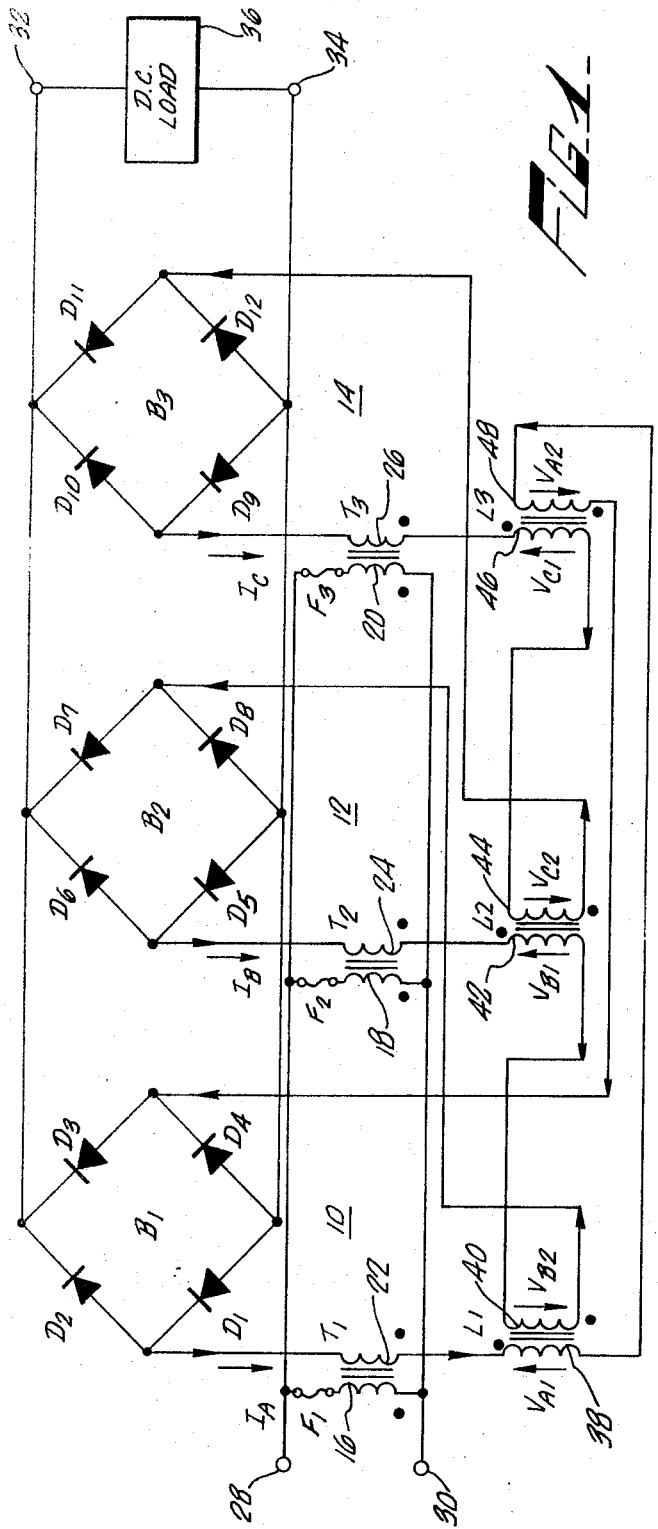
FIG. 1 is a schematic circuit diagram illustrating a first embodiment of the present invention useful with direct current loads.

Referring to FIG. 1 of the drawings, a failsafe transformer configuration may comprise three essentially identical transformer circuits 10, 12 and 14 each including a transformer. As shown, the transformer circuit 10 includes a transformer $T_1$ having a primary coil 16 and a secondary coil 22. Similarly, the transformer circuits 12 and 14 include transformers $T_2$ and $T_3$ having primary coils 18 and 20 and secondary coils 24 and 26, respectively.

The primary coils 16, 18 and 20 are mutually connected in parallel across a pair of input terminals 28 and 30 to which either alternating current (AC) or direct current (DC) power may be applied.

The secondary coils 22, 24 and 26 are respectively connected to apply power to the input terminals of conventional full wave rectifier diode bridge circuits $B_1$, $B_2$ and $B_3$. As shown, the bridge circuit $B_1$ includes four diodes $D_1$, $D_2$, $D_3$ and $D_4$ while the bridge circuit $B_2$ includes the four diodes $D_5$, $D_6$, $D_7$ and $D_8$. The bridge circuit $B_3$ includes the four diodes $D_9$, $D_{10}$, $D_{11}$, and $D_{12}$. The respective output terminals of the bridge circuits $B_1$, $B_2$ and $B_3$ are mutually connected to a pair of output terminals 32 and 34. A DC load 36, to which power is to be applied, may be connected between the output terminals 32 and 34.

Equalizing reactors $L_1$, $L_2$ and $L_3$, each including a pair of inductors, are connected to the secondary coils 22, 24 and 26. These equalizing reactors $L_1$, $L_2$ and $L_3$ serve to produce compensating voltages for correcting any voltage imbalance that may be present in any of the respective transformer circuits 10, 12 and 14. This is accomplished by the reactors $L_1$, $L_2$ and $L_3$ being wired such that the voltage drop across the two inductors in a reactor tend to cancel each other whenever the transformers are operating normally and current flow through each of the secondary coils 22, 24 and 26 is equal. Abnormal operation of the transformers $T_1$, $T_2$ and $T_3$ producing a larger current flow through one of the transformers, will result in the reactors $L_1$, $L_2$ and $L_3$ opposing, and thereby reducing, the larger current flow and assisting, and thereby increasing, the flow of current in the remaining transformers such that power provided by each transformer circuit is equal.

As shown, the equalizing reactor $L_1$ includes the inductors 38 and 40. The equalizing reactor $L_2$ includes the inductors 42 and 44 and the equalizing reactor $L_3$ includes the inductors 46 and 48. The inductors 38 and 48 are serially connected to the secondary coil 22 of the transformer $T_1$ while the inductors 40 and 42 are serially connected to the secondary coil 24 of transformer $T_2$. Similarly, the inductors 44 and 46 are connected in series to the secondary coil 26 of transformer $T_3$. It may be observed that each of the pair of inductors included in the equalizing reactors $L_1$, $L_2$ and $L_3$ is coupled in series with a different one of the secondary coils 22, 24 and 26. In this fashion, any voltage imbalance or nominally increased current flow due to, for example, a faulty diode or an increased mismatch of characteristics occurring in any of the transformer circuits 10, 12 and 14 will affect the current flowing through the secondary coils of the remaining transformer circuits. The amount of power applied across the output terminals 32 and 34 by the respective transformer circuits 10, 12 and 14 is thus able to be continually equalized to compensate for such malfunctions.

Critical malfunctions, such as short circuits in the transformers $T_1$, $T_2$ and $T_3$, will be remedied by the automatic opening of a fuse or breaker $F_1$, $F_2$ and $F_3$, in the primary coil circuit of the associated transformer. The remaining transformers will then continue to share current. An open circuit in any of the transformer circuits 10, 12 and 14 will automatically result in the remaining transformers continuing to provide power to the output terminals 32 and 34.

Operationally, with reference to FIG. 3, assume that a voltage imbalance exists and that an excessive voltage of 103 volts is developed across the secondary coil 22 of the transformer $T_1$ while 100 volts is developed across the respective secondary coils 24 and 26 of transformers $T_2$ and $T_3$. Assume also that chopped direct current is being applied to the primary coils 16, 18 and 20. Waveforms A, C and E represent the voltages developed across the secondary coils 22, 24 and 26. Taking the second half cycle of the applied voltages as an operative example, the excessive voltage developed across the secondary coil 22 will cause the current $I_A$ flowing through the transformer circuit 10 to be abnormally larger than the currents $I_B$ and $I_C$ flowing through the transformer circuits 12 and 14. This abnormally large current $I_A$, when directed through the inductors 38 and 48, will cause a bucking or opposing voltage of, for example 1 volt to be developed across each of the inductors 38 and 48. These combined opposing voltages effectively reduce the voltage applied to the bridge circuit $B_1$ to 101 volts. Conversely, a boosting or assisting voltage of 1 volt will be developed across the inductors 40 and 46 to effectively boost the respective voltages applied to the bridge circuit $B_2$ and $B_3$ to 101 volts. As a result, the amount of power provided to a load 36 coupled between the output terminals 32 and 34 by the respective transformer circuits 10, 12 and 14 will be equalized and the transformers $T_1$, $T_2$ and $T_3$ will share the burden of supplying power to the load 36. This equalizing of voltage imbalances is illustrated by the waveforms B, D and F of FIG. 3.

From the foregoing discussion, it is clear that each of the transformer circuits 10, 12 and 14, respectively including the transformers $T_1$, $T_2$ and $T_3$, are active during normal operation. The respective transformers $T_1$, $T_2$ and $T_3$ may be designed to effectively operate at 66 percent of their capacity. Accordingly, should any of the transformers $T_1$, $T_2$ or $T_3$ be disabled, such as by a critical malfunction, the remaining transformers would be capable of automatically providing the normal amount of power to the load 36 by operating at 100 percent of their respective capacities.

To summarize, increasing currents in any of the transformer circuits 10, 12 and 14 produced by mismatches of component characteristics will be compensated by the equalizing reactors $L_1$, $L_2$ and $L_3$. Should a critical malfunction occur, wherein the faulty transformer is effectively removed from the multiple transformer configuration, power will continue to be supplied by the remaining two transformers which are connected in parallel with respect to each other and with respect to the inoperative transformer. Power is thus continually supplied to the DC load 36 without any interruption which may produce additional malfunctions in associated components.

It is understood that the DC load 36 may include components, such as filter circuits, that are necessary to optimize the characteristics of the power applied thereto at the output terminals 32 and 34.

It is to be noted that the respective inductors included in the equalizing reactors $L_1$, $L_2$ and $L_3$ should be designed to be capable of supplying a sufficient supporting or boosting voltage to compensate for the largest voltage imbalance that is to be compensated for between the transformer circuits 10, 12 and 14. Such imbalances may be caused, for example, by an imperfect matching of the transformers $T_1$, $T_2$ and $T_3$ and the diodes $D_1$–$D_{12}$ even though such components are chosen to have identical characteristics. It can be reasonably expected that only a nominal degree of mismatching will be present under ordinary circumstances and that this mismatching of components will produce only a nominal degree of voltage imbalance.

Figure 2:
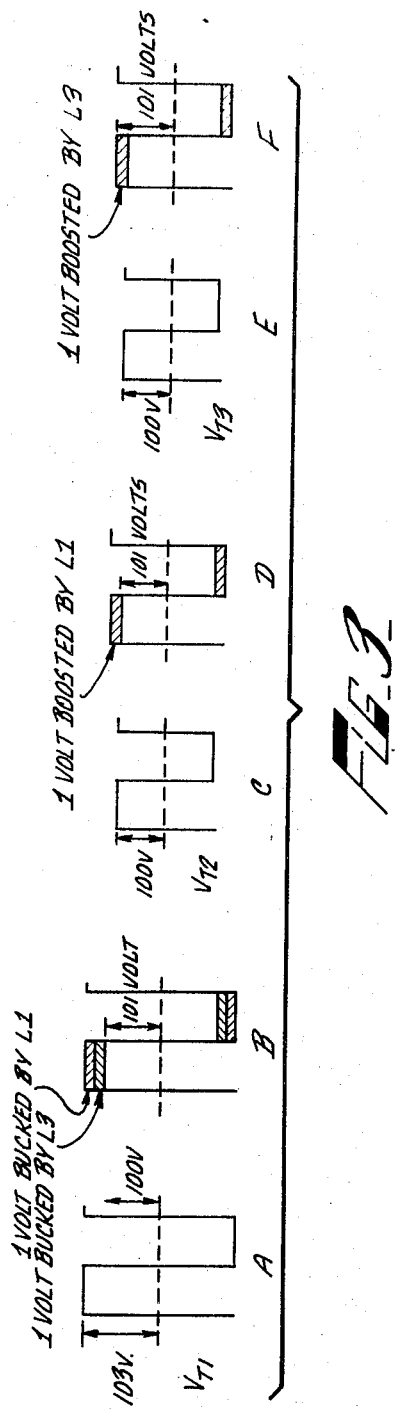
FIG. 2 is a schematic circuit diagram illustrating a second embodiment of the present invention useful with alternating current loads.

Referring now to FIG. 2, a multiple transformer circuit configuration for supplying power to alternating current loads is illustrated. Again, the illustrated configuration includes three transformers. Each of the transformers is designed to include a pair of secondary coils for each primary coil (not shown). For example, transformer $T_1$ includes the secondary coils 50 and 52. A transformer $T_2$ includes the secondary coils 54 and 56, and a third transformer $T_3$ would include the secondary coils 58 and 60. These secondary coils are parallel connected in two sets 62 and 64 to accommodate each of the half cycles of the alternating current power supplied to an AC load 66 coupled between the output terminals 80 and 82. This two-set configuration is generally employed to prevent a malfunction involving a short circuit in a secondary winding, for example, the secondary winding 50, from being reflected to other secondary coils.

More specifically, a diode is connected in series with each of the secondary coils to prevent a short circuit malfunction, in any of the secondary coils, from being reflected to the other secondary coils in the set. As shown, the diodes 68, 70, 72, 74, 76 and 78 are respectively connected in series with the secondary coils 50, 52, 54, 56, 58 and 60. A pair of silicon-controlled rectifiers (SCR's) are connected in series with the load 66 for each set of secondary coils 62 and 64, to prevent a short circuit malfunction in a secondary coil from being reflected between the secondary coil sets 62 and 64.

Assuming that the set of secondary coils 62 accommodates the positive half cycles and the secondary coil set 64 accommodates the negative half cycles of alternating current power, the SCR 84 must be enabled for the duration of the positive half cycles and the SCR 86 must be enabled for the duration of the negative half cycles. These SCR's 84 and 86 may be respectively enabled by gating circuits 88 and 90.

Each of the gating circuits 88 and 90 may include a secondary coil and a resistor which are serially connected between the gate and the cathode of the SCR. As shown, the gating circuit 88 includes the secondary coil 92 and the resistor 94 which are connected in series between the gating lead 96 and the cathode 98 of the SCR 84. Similarly, the gating circuit 90 includes the secondary coil 100 and the resistor 102 connected in series between the gate terminal 104 and the cathode 106 of the SCR 86.

Redundancy may be provided for the gating circuits 88 and 90 if desired by including additional parallel connected secondary coil/resistor combinations. For example, the gating circuit 88 may include redundant secondary coil/resistor combinations 108 and 110. Similarly, the gating circuit 90 may include redundant secondary coil/resistor combinations 112 and 114. The respective secondary coils included in a gating circuit may be inductively coupled to the primary coils associated with the secondary coil set. For example, the secondary coil 92 may be inductively coupled to the primary coil of transformer $T_1$.

Voltage imbalances in the configuration of FIG. 2 are accommodated in the same fashion as described in connection with the configuration of FIG. 1. More specifically, this may be accomplished by the inclusion of the equalizing reactors $L_4$, $L_5$, $L_6$, $L_7$, $L_8$ and $L_9$ which are respectively coupled to the secondary coils 50, 52, 54, 56, 58 and 60. In that the function of these equalizing reactors is identical to the operation described in connection with the configuration of FIG. 1, no further discussion of the operation of the equalizing reactors $L_4$ through $L_9$ is considered to be necessary.

A critical malfunction such as a short circuit in a transformer will be automatically corrected for by the inclusion of fuses or breakers in the primary coil circuit of the respective transformers, as earlier discussed.

It is to be understood that although only three redundant transformer circuits have been illustrated in the configurations of FIGS. 1 and 2, that any desired number of redundant transformer circuits may be employed. Further, the respective transformers included in the transformer circuits may be designed to accommodate the failure of any desired number of transformers. For example, in the configuration of FIG. 1, the transformers $T_1$, $T_2$ and $T_3$ may be designed to normally operate at only one-third of their respective capacities. Thus, should the transformers $T_1$ and $T_2$ become completely inoperative, $T_3$ could then serve to supply all of the power to the DC load 36 by operating at 100 percent of its capacity.

From the foregoing, it may now be appreciated that the present invention does not require the use of fault detecting circuits which are customarily complex, include a large number of elements or components, and require extensive testing to provide the desired degree of accuracy and reliability. Additionally, idle standby or backup transformers are not employed in that each of the transformers included in the present invention actively share in providing power to the desired load.

What is claimed is:

1. A multiple transformer circuit comprising:
a plurality of transformers each including a primary coil and at least one secondary coil, said primary coils being mutually connected in parallel;
a plurality of equalizing reactors, each reactor including a pair of inductors, each inductor of said pair being coupled in series with a different one of said secondary coils;
output terminal means for providing power to a load; and
means for coupling each of said secondary coils to said output terminal means.

2. The apparatus defined by claim 1 wherein said means for coupling each of said secondary coils to said output terminal means comprises a plurality of full wave rectifier circuits each having input leads and output leads, each of said rectifier circuits having the input leads thereof connected to a single one of said secondary coils, said output leads being connected to said output terminal means such that said plurality of full wave rectifier circuits are mutually connected in parallel.

3. The apparatus defined by claim 2 wherein said full wave rectifier circuits are diode bridge circuits.

4. The apparatus defined by claim 3 wherein any load connected to said output terminal means is adapted to be responsive to direct current.

5. The apparatus defined by claim 1 wherein at least two of said inductors are serially connected with each of said secondary coils.

6. The apparatus defined by claim 1 wherein alternating current is applied to any load connected to said output terminal means and wherein said transformers each include first and second secondary coils, said first secondary coils being mutually coupled in parallel as a first set for accommodating a first half cycle of said alternating current, said second secondary coils being mutually coupled in parallel as a second set to accommodate a second half cycle of said alternating current.

7. The apparatus defined by claim 6 further including a plurality of diodes, each of said secondary coils having a single one of said diodes coupled in series therewith.

8. The apparatus defined by claim 7 further including:
first switching means for operatively coupling said first set of said first secondary coils to said output terminal means for the duration of said first half cycle; and
second switching means for operatively coupling said second set of said second secondary coils to said output terminal means for the duration of said second half cycle.

9. The apparatus defined by claim 8 wherein said first and second switching means each include:
a silicon-controlled rectifier coupled in series with a load connected to said output terminal means; and
gating means for enabling said switching means for the duration of one of said half cycles, said first switching means being enabled for the duration of a first half cycle and said second switching means being enabled for the duration of a second half cycle.

10. The apparatus defined by claim 9 wherein each of said silicon-controlled rectifiers includes an anode, a cathode and a gate lead, and wherein said gating means includes at least one inductor and one resistor serially connected between said gate lead and said cathode, an inductor included in said first switching means being inductively coupled to a primary coil associated with one of said first secondary coils, and an inductor included in said second switching means being inductively coupled to a primary coil associated with one of said second secondary coils.

11. The apparatus defined by claim 10 wherein at least two of said inductors are serially connected with each of said secondary coils.

* * * * *